(12) United States Patent
Bentzen

(10) Patent No.: US 9,170,019 B2
(45) Date of Patent: Oct. 27, 2015

(54) METHOD AND SYSTEM FOR PRODUCTION OF A CLEAN HOT GAS BASED ON SOLID FUELS

(75) Inventor: Jens Dall Bentzen, Birkerød (DK)

(73) Assignee: Dall Energy Holdings ApS, Birkerod (DK)

( * ) Notice: Subject to any disclaimer, the term of this patent is extended or adjusted under 35 U.S.C. 154(b) by 1124 days.

(21) Appl. No.: 13/060,096

(22) PCT Filed: Aug. 28, 2009

(86) PCT No.: PCT/DK2009/050222
§ 371 (c)(1),
(2), (4) Date: Mar. 14, 2011

(87) PCT Pub. No.: WO2010/022741
PCT Pub. Date: Mar. 4, 2010

(65) Prior Publication Data
US 2011/0146155 A1    Jun. 23, 2011

(30) Foreign Application Priority Data

Aug. 30, 2008  (DK) .................................. 2008 01206

(51) Int. Cl.
*C10B 1/00*    (2006.01)
*C10B 31/02*    (2006.01)
(Continued)

(52) U.S. Cl.
CPC ... *F23G 5/24* (2013.01); *C10J 3/34* (2013.01); *C10J 3/723* (2013.01); *C10J 3/80* (2013.01); *C10K 1/101* (2013.01); *F23G 5/027* (2013.01); *F23G 5/50* (2013.01); *F23L 7/007* (2013.01); *C10J 2200/09* (2013.01); *C10J 2200/154* (2013.01); *C10J 2200/158* (2013.01); *C10J 2300/092* (2013.01); *C10J 2300/0916* (2013.01); *C10J 2300/0946* (2013.01); *C10J 2300/0956* (2013.01); *C10J 2300/0973* (2013.01);
(Continued)

(58) Field of Classification Search
USPC ................. 48/61, 127.9, 127.1, 76, 200–203, 48/71–73
See application file for complete search history.

(56) References Cited

U.S. PATENT DOCUMENTS 3,680,503 A    8/1972  Danielsson et al.
4,052,173 A *  10/1977 Schulz ........................... 48/202
(Continued)

FOREIGN PATENT DOCUMENTS

BE          537255        4/1955
DE     199 37 188 C1    12/2000
(Continued)

OTHER PUBLICATIONS

Spravochnik potrebitelya biotopliva: Pod red. Villu Vares, Tallin, 2005.
(Continued)

*Primary Examiner* — Kaity Handal
(74) *Attorney, Agent, or Firm* — Knobbe Martens Olson & Bear LLP

(57) ABSTRACT

Solid fuel can be converted into a clean hot flue gas with a low content of volatile organic compounds (VOC's), NOx and dust, and clean ash with a low carbon content by means of a stage-divided thermal reactor, where the conversion process of the solid fuel is in separate vertical stages (from below and up): ash burn-out, char oxidation and gasification, pyrolysis, drying, and a gas combustion stage where gas from the gasifier is combusted.

23 Claims, 13 Drawing Sheets

(51) Int. Cl.
| | |
|---|---|
| *F23G 5/24* | (2006.01) |
| *C10J 3/34* | (2006.01) |
| *C10J 3/72* | (2006.01) |
| *C10J 3/80* | (2006.01) |
| *C10K 1/10* | (2006.01) |
| *F23G 5/027* | (2006.01) |
| *F23G 5/50* | (2006.01) |
| *F23L 7/00* | (2006.01) |

(52) U.S. Cl.
 CPC .. *C10J2300/1884* (2013.01); *C10J 2300/1892* (2013.01); *F23G 2201/303* (2013.01); *F23G 2201/304* (2013.01); *F23G 2201/40* (2013.01); *F23L 2900/00001* (2013.01); *Y02E 20/344* (2013.01)

(56) References Cited

U.S. PATENT DOCUMENTS

| | | | |
|---|---|---|---|
| 4,261,269 A | | 4/1981 | Mallek et al. |
| 4,732,091 A | * | 3/1988 | Gould .................. 110/229 |
| 5,205,227 A | * | 4/1993 | Khinkis et al. .......... 110/345 |
| 6,024,032 A | * | 2/2000 | Sharpe .................. 110/342 |
| 2004/0170210 A1 | * | 9/2004 | Do et al. ................ 373/118 |
| 2005/0247553 A1 | * | 11/2005 | Ichikawa et al. ......... 202/96 |
| 2013/0239479 A1 | * | 9/2013 | Gao et al. .................. 48/89 |

FOREIGN PATENT DOCUMENTS

| | | |
|---|---|---|
| DE | 10 2005 000 768 | 7/2006 |
| EP | 0 096 169 A1 | 12/1983 |
| EP | 1 201 993 A1 | 5/2002 |
| WO | WO 01/68789 A1 | 9/2001 |
| WO | WO 2007/036236 A1 | 4/2007 |
| WO | WO 2007/081296 A1 | 7/2007 |
| WO | WO 2008/004070 A1 | 1/2008 |

OTHER PUBLICATIONS

Review of Finnish biomass gasification technologies / OPET Report 4, Technical research Centre of Finland, ESPOO 2002.

Chen, G. et al., "Biomass gasification integrated with pyrolysis in a circulating fluidised bed" Solar Energy, 2004, pp. 345-349, vol. 76.

* cited by examiner

METHOD AND SYSTEM FOR PRODUCTION OF A CLEAN HOT GAS BASED ON SOLID FUELS

CROSS-REFERENCE TO RELATED APPLICATIONS

This application claims the benefit and priority to and is a U.S. National Phase Application of PCT International Application Number PCT/DK2009/050222, filed on Aug. 28, 2009, designating the United States of America and published in the English language, which is an International Application of and claims the benefit of priority to Danish Patent Application No. PA 2008 01206, filed on Aug. 30, 2008. The disclosures of the above-referenced applications are hereby expressly incorporated by reference in their entireties.

BACKGROUND OF THE INVENTION

1. Field of the Invention

The invention relates inter alia to a method and a system for producing clean hot flue gas with a low content of volatile organic compounds (VOC's), NOx and dust, and clean ash with a low carbon content by means of a stage-divided thermal reactor. In the stage-divided thermal reactor the conversion process of the solid fuel is in separate vertical stages (from below and up): ash burn-out, char oxidation and gasification, pyrolysis, drying and a gas combustion stage wherein gas from the gasifier is combusted. The gas-combustion stage functions both as gas burner and heat source for drying and pyrolysis the top layer of the updraft gasifier.

2. Description of Related Art

Production of hot flue gases during thermal conversion of fuel is well known. Hot flue gas can be used for several purposes, e.g. for production of steam, hot water, hot oils etc.

Reference is made to WO 2007/036236 A1, which concerns heat recovery of hot gas produced in a thermal reactor, by injecting water into the gas at one or more injection zones in such an amount and in such a way that, due to water evaporation, the gas temperature is reduced to below 400° C. and the gas dew point becomes at least 60° C., preferably at least 70° C., possibly 80 or 85° C. The gas can then be led through a condensing heat exchanger unit, wherein at least some of contents of water vapour in the gas are condensed, and the condensing heat can be utilized for heating of a stream of fluid, mainly water and WO/2007/081296, which relates to a gasifier that can run by downdraft or updraft to produce syngas from sorted/unsorted municipal solid waste (MSW), refuse-derived fuel (RDF), industrial waste including sludge from waste water treatment plant, leather industry residues, agricultural waste and biomass comprising: a bottleneck zone, a drying zone, a pyrolysis zone, a reduction and oxidation zone, an ash section, a safety valve, a rotary valve, a vibrator and several igniters and U.S. Pat. No. 6,024,032 A: A process for the production of heat energy from solid carbonaceous fuels is disclosed. The process comprises subjecting the carbonaceous fuel to substantially anaerobic pyrolysis in at least one first zone and thereafter transferring the char resulting from the pyrolysis to a second zone which is separated from the first zone or zones. The char is subjected to gasification in the second zone by introduction of primary combustion air, optionally with steam and/or recycled exhaust gas. The off gases from the second zone and the pyrolysis gases from the first zone or zones are thereafter subjected to secondary combustion. The first zone or zones is heated by heat derived from the secondary combustion. Ash is removed from the bottom of the second zone and WO 01/68789 A1: A staged gasification process and system for thermal gasification of special waste fractions and biomass, e.g. wood, comprising a drier (1), in which the fuel is dried upon contact with superheated steam. The dried fuel is fed into a pyrolysis unit (4) to which superheated steam is also supplied. The volatile tar, containing components produced in thepyrolysis unit (4), is passed to an oxidation zone (5) in which an oxidation agent is added so as to cause a partial oxidation, whereby the content of tar is substantially reduced. The solid fuel components from the pyrolysis unit (4) may be fed into a gasification unit (6) to which hot gases from the oxidation zone (5) are supplied. In the gasification unit (6) the solid fuel components are gasified or converted to carbon. The gas produced in the gasification unit (6) may be burnt in a combustion unit (7), such as a combustion engine. Thus, a gasification process is obtained for gasification of biomass and waste with a high energy efficiency, low tar content of the gasification gas and with moderate risk of slagging for a wide spectrum of fuels, including fuels with a large content of moisture and WO 2008/004070 A1: A method of controlling an apparatus for generating electric power and apparatus for use in said method, the apparatus comprising: a gasifier for biomass material, such as waste, wood chips, straw, etc. . . . . . Said gasifier being of the shaft and updraft fixed bed type, which from the top is charged with the raw material for gasification and into the bottom of which gasifying agent is introduced, and a gas engine driving an electrical generator for producing electrical power, said gas engine being driven by the fuel gas from the gasifier. By supplying the produced fuel gas directly from the gasifier to the gas engine and controlling the production of the fuel gas in the gasifier in order to maintain a constant electrical output power, the necessity of using a gas holder between the gasifier and the gas engine is avoided.

Thermal Reactors

Solid fuel is usually converted into a burnable gas (gasification) or into a flue gas (combustion) in a moving bed or a fluid-bed reactor.

Moving-bed reactors are typically divided into following categories: updraft (air/gas goes up and fuel down); downdraft (air and fuel go down) or grate/stoker-based system (moving grate, vibrating grate, stoker) where fuel moves horizontally (often with a slope downwards).

Fluid-bed reactors are typically divided into the following categories: bubbling fluid bed (BFB), circulating fluid bed (CFB) or entrained flow (EF).

Most reactors are originally designed for conversion of coal. Fresh solid fuel such as biomass or waste has very different properties compared to coal. Especially the content of volatiles and water is much higher in biomass and waste. In coal, the volatile content is normally below 30%, whereas for biomass and waste the volatile content is normally above 65% (dry ash free weight basis). Further, the content of water in fresh biomass and waste is often above 20%, and even often above 50%, so drying of the fuel is often a very important issue in biomass and waste reactors. Further, the content and the composition of the ash can be very different for coal and biomass/waste. Also the content of alkali metals (Na, Ka), Chlorine, Potassium, Silica etc. may be much higher, and ash melting points of biomass and waste are known to be much lower than in coal.

Therefore, standard "coal reactors" are not optimal for conversion of biomass and waste.

Feeding Systems and Means of Transporting the Fuel

Feeding systems are normally screw or push type or pneumatic "spreader stoker" feeders.

In grate systems, the fuel is transported by the grate. In most cases, combustion air is led through the grate. These systems may have several problems including hot spots on the grate, uneven air distributions, ash/char falling through the grate, controlling the stages on the grate etc.

In fluid-bed systems, the fuel is mixed with the bed material. The fluid-bed systems may have problems with separating the bed material from the ash, and with separating the different process steps as fluid beds are normally well-stirred reactors.

Updraft gasifiers are usually used when the aim of the conversion is production of a burnable gas. Updraft gasifiers are usually used for production of town gas and lately also for gas-engine operation, such as described in WO 2008/004070 A1. In updraft gasifiers, there is a simple feeding and transporting mechanism, both into the reactor and out of the reactor, where the ash can be removed in a cold state. When the ash layer is in the bottom of the reactor, the gasification agent (air/steam) is added. It is well known that updraft gasifiers convert the fuel very well and that there is very little carbon in the ash. Updraft gasification technology is known as a simple and robust technology. However, the updraft gasification technology has some disadvantages such as The produced gas has a high content of CO, tars and other unburned gases, which are difficult to clean up when syn-gas production is the aim of the gasifier Scaling up is normally difficult as round shapes are usually used The bed is relatively high, such as 4 meters or more when wet fuel is to be used as drying needs long reaction time. In systems such as U.S. Pat. No. 6,024,032 A and WO 01/68789 A1 one or several of the process reactions are physically separated from the others. This can have some process advantages, but it also has the disadvantages that the reactors become Larger More expensive to built More expensive to do maintenance on.

Water Content in the Fuel

Normally, a combustion unit is made for either fuel with high water content (and low heating value) or for fuel with low water content (with high heating value). However, costumers often prefer a unit that can burn a broad range of fuels.

WO 2007/036236 A1 describe a solution to this problem: If the combustion unit is designed for wet fuels and receives a dry fuel then the lack of water in the fuel can be compensated by adding water to the fuel or into the thermal reactor, so the drying zone doesn't become too hot, thus resulting in NOx formation and/or overheating materials.

Gas Combustion

One of the major technical and environmental problems in converting solid fuels into a clean flue gas is to prevent unwanted substances in the flue gas. These substances include Organics materials: CO, PAH (Poly Aromatic Hydrocarbons), Dioxin or VOC NOx Particles Other.

In state-of-the-art combustion plants, there are often several air-injection stages (primary, secondary and tertiary air) with a high number of nozzles and/or downstream gas cleaning means such as NOx removal filters, oxidizers for organic materials or dust collectors to get low enough emissions.

Combustion of organics materials can be optimized, by ensuring effective mixing between oxygen and gas; and ensuring high retention time, such as 2 seconds or above, and by ensuring a high combustion temperature, such as 900° C. or above.

Thermal NOx is formed in the gas combustion stage and is mainly depending on the temperature. The higher the temperature is, the more NOx formation, but also the higher the oxygen content is, the more NOx is formed. The NOx formation is moderate when the temperature is below 1100° C., but NOx formation accelerates when the temperature gets much above 1100° C.

Particle emission is normally high from fluid-bed reactors and for grate systems whereas updraft gasifiers are known to produce a gas with very few particles.

Fuel NOx

Besides thermal NOx, as described above, NOx can be formed from the nitrogen in the fuel: Fuel-NOx is formed when there are over stoichiometric air-fuel ratio in the fuel. This is often the case in grate systems and in fluid bed combustors, whereas in updraft gasifiers this it not the case. It is well known that updraft gasifiers produce gas with low NOx.

Oxygen Content in Flue Gas

An important parameter for combustion plants is the oxygen content in the flue gas. The lower the oxygen content is, the better.

There are several advantages to low-excess oxygen including:

Lower investment cost and energy consumption for air blower

Lower amount of flue gas and therefore smaller and cheaper components downstream of the thermal reactor Higher steam ratio in the flue gas and therefore better radiation properties Higher water dew point in the flue gas and therefore higher energy efficiency in a condensation cooler.

Typically, the excess air is more than 5%, such as 7% (dry basis), which corresponds to a lambda (stoichiometric ratio) of 1.3 or more.

Steam Content in Flue Gas

There are several advantages of a high steam content in the flue gas. These advantages include, but are not limited to:

Radiation properties improved

Recovering of heat in condensing unit improved

Soot formation prevented

Limitation of temperature and hence NOx formation.

Air Distribution

In typical combustion plants, air is distributed to many of the combustion stages:

The drying stage

The pyrolysis stage

The gasification/oxidation stage

The ash burn-out stage

The gas combustion stage, and here often in several stages (secondary and tertiary stages).

When oxygen is let into the drying and/or pyrolysis stage and/or oxidation stage it is not specifically aimed for either burn-out of de-volatilized char or gas combustion, which then results in a high level of excess air for the total plant.

Steam and Oxygen Content in the Combustion Air

Normally untreated air is used for combustion, but the properties of the air can be improved by adding steam and/or oxygen to the air.

Steam in the primary air results in lower temperatures in the oxidation zone, which prevent slagging of the ash and it improves the gasification reactions ($H2O+C \rightarrow CO+H2$).

Steam in the secondary air reduces temperatures in the gas combustion section, thus reducing NOx. Further steam prevents soot formation.

A high content of oxygen results in a lower mass flow of combustion fluid, thus reducing size of plant.

Carbon Content in the Ash

In grate and fluid-bed systems, the carbon content of the ash is often 10% or more. This leads to an efficiency and environmental problem: The carbon contains valuable energy, which is not utilised, but also environmental unfriendly substances, such as PAH.

Further, a main technical problem is often that ash sinters at 700-900° C. depending on the ash components. To prevent ash sintering in fluid beds and grate systems, the char content is often high, such as 10% or above.

Further, in grate systems, unburned fuel with high char content often falls through the grate; hence the char content in the bottom ash will increase.

Ash Removal System

In grate systems and in fluid-bed systems, the ash removal systems are costly and complicated.

In fluid-bed systems, ash and sand are mixed, so after ash/sand removal, the sand needs to be separated from the ash.

Ash-removal systems of updraft gasifiers can be made simple, as the temperature on the grate is low.

Moving Parts in the Reactor and in the Hot Stages

In grate systems, the fuel is moved from the inlet to the ash outlet by a grate. Typically, this grate is made of high-grade steel, which is both costly and also needs replacement. Normally, a part of the grate is replaced at least every year, and costs related to downtime, materials and labour may be very high.

In some updraft gasifiers, there is a large stirrer in the top to even out the fuel.

Shapes

Fluid-bed reactors and updraft gasifiers are typically round, whereas grate systems are typically rectangular.

The round shape in typical updraft gasifiers results in a maximum size of about 10 MWthermal. A typical key figure of updraft gasifiers is 1 MW/m2 of char gasification reactor. At 7 MW, the diameter is then more than 3 m, and at this size, the flow may become uneven. Therefore, it is recognized that app. 10M W is the maximum input of updraft gasifiers.

Size of Plants

Combustion plants are made in very small scale, such as stoves of 5 kW and even below, or in very large scale, such as coal-fired power plants, which can be several hundred MW.

Turn-Down Ratio

A typical turn-down ratio of grate systems and fluid beds is about 1:2, whereas updraft gasifiers may have a turn-down ratio of 1:10 or even 1:20.

SUMMARY OF CERTAIN INVENTIVE ASPECTS

The present invention provides an improved method and an improved system or installation for combustion of biomass and waste. Various aspects, features and embodiments of the invention will be presented in the following.

Thermal Reactors

The present invention may be viewed as using a moving-bed technology. The updraft gasification principle is used for converting the fuel into gas and ash: In many preferred embodiments fuel is fed into the top and converted into a burnable gas in the following successive and coherent stages (from top and down): a drying stage, a pyrolysis stage, a char gasification and an oxidation stage and an ash burn out stage. Above the updraft gasifier is a gas combustion stage where the gases from the updraft gasifier are burned, and heat from the gas combustion is transferred to the top layer of fuel in the updraft gasifier, which hereby effectively dries and pyrolyses the fuel.

Thus, the present invention provides a method for decomposing combustible organic material, said method comprising: heating the fuel at separate stages (e.g. a drying stage, a pyrolysis stage, a gasification and oxidation stage a burn-out stage and a gas oxidation stage) to temperatures causing the fuel to decompose into gaseous and solid components.

Further, the fuel at the drying stage and the pyrolysis stage is heated by means of the gasses formed by the oxidation processes.

In the present context "stage" is preferably used to designate a specific region within a chamber, which chamber being defined by wall elements. In addition, a stage is preferably defined as a region in which a given process is taken place. In the present content, the various stages (e.g. drying, pyrolysis, char gasification and oxidation, ash burn out) are separate coherent stages in the sence that the different processing of the fuel are carried out in separate stages. In addition, the stages are successive and coherent in the sense that fuels goes directly from one stage to another.

Accordingly, in several aspects of the invention, a method for converting a solid carbonaceous fuel into flue gas and ash in a thermal reactor is provided, said method comprising heating the fuel at separate stages to temperatures causing the fuel to decompose into gaseous and solid components, the stages comprising a pyrolysis stage, in which the fuel is pyrolysed without addition of oxygen, a gasification and oxidation stage an ash burn-out stage to which oxygen is supplied, and a gas combustion stage to which oxygen is supplied, wherein the fuel at the pyrolysis stage being heated by means of the gases formed in the gasification and oxidation stage and the gas combustion stage.

The stages are in many aspect of the invention coherent and in the gasification and oxidation stage char is converted to gas.

The word fuel may be either a single fuel or any type of combination of fuels. The gasification and oxidation stage may be separate stages, however, in many preferred embodiments of the invention the gasification and oxidation stage is in practise one stage.

Transporting Systems

The fuel is transported into the thermal reactor. Preferably, the gasifier does not need any transporting mechanism inside the reactor besides the ash removal system.

Description of the Stages in the Solid Part (from Top to Bottom)

Fresh fuel is preferably transported into the reactors drying stage. In the drying stage, the water in the fuel evaporates. Fuels may have a very little water content, such as a few %, or fuels may have high water content, such as 55% (weight basis) or higher. At atmospheric pressure, drying happens when the fuel is heated to 100° C. The higher the temperature is, the faster is the drying process. The energy for the drying process comes from two internal processes:

Heat from the gas combustion above, primarily transferred by radiation and convection Heat from the char gasification below, primarily transferred by convection.

As the drying stage is effectively heated to a high temperature, such as 400° C. or even 600° C. or above, the drying reaction time in this reactor is short, such as below 5 minutes, thus resulting in a very compact drying stage.

When the fuel is dried and further heated, further de-volatilization occurs in the *pyrolysis* stage. In the pyrolysis stage, the solid organic fuel is heated to a temperature between app. 300° and 900° C. and decomposed into a solid component containing char and ash and a gaseous component containing organic components including tars, methane, CO, CO2, H2 and H2O etc.

The energy for the pyrolysis process comes primarily from two other internal processes:
  Heat from the gas combustion above, primarily transferred by radiation and convection
  Heat from the char gasification below, primarily transferred by convection.

As the pyrolysis stage is effectively heated to a high temperature, such as 500° C. or even 700° C. or above, the pyrolysis reaction time according to this invention is very short, such as below 5 minutes, thus resulting in a very compact pyrolysis stage.

Compact drying and pyrolysis stages result in a plant with reduced building height and reduced material costs.

In the char oxidation and gasification stage, the solid component produced in the pyrolysis stage is converted into a burnable gas and a carbon-rich ash. Gasification reactions (mainly CO2+C→2 CO and H2O+C→CO+H2) are endothermal (energy consuming). Gasification agent is the gas produced by the oxidation. The temperature in the gasification and oxidation stage is between 600° C.-1100° C. In literature, "gasification" is often named "reduction".

In the oxidation stage, the carbon that is not gasified in the gasification stage is oxidized/burned by use of oxygen. Besides oxygen, also steam and nitrogen can be added as dry air, moisturized air, and steam can also be let to the oxidation stage. The temperature in the oxidation stage is between 700-1100° C.

Below the oxidation stage is the ash. The oxidation agent (air) and possibly steam are let into the ash layer. The temperature of air/steam is low, such as below 300° C. or even below 100° C. Hereby, a final burn-out is done and the ash is cooled, resulting in a cold ash, such as below 300° C., or even below 200° C., with a very low content of carbon, such as below 10% on a weight basis or even as low as 5% or below.

The ash can be removed by an ash removal system.

Description of the Gas Combustion Part (Above the Solid Part)

The updraft gasifier produces a combustible gas containing H2O, H2, CO, CO2, CH4 and higher hydrocarbons. As the temperature of the top of the pyrolysis stage is high, such as 700° C. or above, the gases H2O, H2, CO and CO2 will be close to equilibrium. Due to the high water content of the fuel or if convenient addition of water and the use of steam and/or moisturized air in the gasifier, resulting in a high H2 content, implying the positive effect that the later gas combustion is very fast, as H2 increase the flame speed. A typical gas composition just above the bed may be:

H2O 30%, H2 23%, CH4 1%, CO 8%, CO2 13%, N2 25%.

The combustible gases are converted into CO2 and H2O due to oxidation with air. The gas-combustion process is carried out near the bed surface, such as 4 meters or below, and hereby the top of the bed is heated by the gas combustion stage mainly by radiation, but also somewhat by convection.

The heat transfer from the gas combustion to the bed results in a colder flame, reducing NOx and soot formation.

In the thermal reactor, further cooling items can be inserted such as steam super heater or other types of superheates i.e. helium based superheaters for use in stirling engines.

Also water and/or thermal oil boilers can be used to cool the thermal reactor.

Preferably, the air nozzles are placed in a uniform height in the thermal reactor, and preferably the nozzles point horizontally or even a bit downwards, e.g. in an angle of 0-20 degrees in such a way and in such a height that heat transfer to the bed below is optimized.

Preferably, the walls of the thermal reactor are shaped in such a way that there is some back mixing/recirculation of the flue gas which will improve CO and NOx reduction and in such a way that radiation from the hot walls and to the top layer of the fuel is increased.

Preferably, moisturized air is used for the combustion, as moisturized air keeps the temperature down and thus NOx formation low.

The nozzles are designed to give the right speed of combustion air so a good burn-out is secured. Typically, the nozzle speed will be between 10-40 m/s at full load.

The temperature in the gas combustion part is typically between 900-1100° C.

Water Content in Fuel

A combustion unit according to the present invention can use a wide spectrum of fuels, such as wet fuels with a low heating value or dry fuels with a high heating value. This advantage comes from the possibility to have a water sprinkling system installed in plants that should be able to use both types of fuel.

The water sprinkling system will ensure a steady and controlled combustion process as—when the fuel becomes dryer, and the temperature in the thermal reactor is about to increase—the water sprinkling system will stabilise the temperature, water being sprinkled into the fuel and/or into the thermal reactor. The water will evaporate, and due to the high evaporation energy in the water, the temperature in the thermal reactor will be reduced.

The water sprinkling system further has the advantages that:
  NOx formation is prevented with lowered temperature
  Soot production is lowered with lowered temperature and increased steam content
  Radiation properties are increased with higher steam content
  Condensation energy to be recovered for heat production in low-temperature condenser is increased with the amount of water evaporated in the thermal reactor.

A system that adds water to the system can ensure a very stable temperature, independently of the fuel heating value in the thermal reactor, and hereby stable and low emissions.

Gas Combustion
  Organic materials are effectively combusted into CO2 as the oxidation stage offers a good mixing between air/gas and the retention time is high, such as 2 seconds or above.
  Further, the gases that arrive to the gas combustion have a high temperature, such as 500° C. or even 700° C. or above due to the intense radiation to the drying/pyrolysis stage, so the reaction time for converting the gas is very low.
  Further, the temperature region of 900-1100° and a high ratio of 02 per gas component to be combusted ensure a fast and effective combustion.
  NOx formation in the gas phase is limited as the temperature in the gas combustion stage is limited to below 1100°C. Further, moisturized air can be used for gas combustion, which will also reduce NOx formation.

The updraft gasifiers will produce a gas with very few particles compared to grate systems and fluid beds. Moreover, an increased bed area in the top of the gasifier can reduce the particle emission further, as the upward gas velocity will be reduced with increased area. Further, a water sprinkling system can reduce particle emission as water droplets can catch particles and make them return to the bed, as in a scrubber system.

It shall here be noted that U.S. Pat. No. 6,024,032 result in a gas combustion temperature of 1100-1300 C, which both will result in high NOx and in high maintenance costs as the construction in U.S. Pat. No. 6,024,032 is complex.

Fuel NOx

Low NOx is an important feature of the present invention. Fuel-NOx is formed when there are over stoichiometric air-fuel ratio in the fuel. In the present invention, there is no excess air in the char oxidation stage as the present invention uses the updraft gasification principle, which is known to produce gas with low NOx.

Oxygen Content in Flue Gas

A main advantage in the present invention is that the content of excess air is limited. Typically, the excess air is more than 5%, such as 7% (dry basis), which corresponds to a lambda (stoichiometric ratio) of 1.3 or more. In the present invention, the excess air is below 5%, such as 4% (dry basis) or even lower.

Such very low excess air is achieved as most of the air, approximate 80% of the air, is lead to the gas produced in the updraft gasifier. 4% excess air corresponds to a stoichiometric air-gas ratio of 1,3 which is normal for gas-combustion processes.

The low oxygen content in the present invention is partly due to the specific air distribution (see below) and partly due to the fact that the gases that leave the gasifier according to the invention are warmer than in traditional updraft gasifiers (hot gas needs less oxygen for complete combustion than cold gas).

There are several advantages of low excess air including:
Lower investment cost and energy consumption for air blower
Lower amount of flue gas and therefore smaller and cheaper components downstream the thermal reactor
Higher steam ratio in the flue gas and therefore better radiation properties
Higher water dew point in the flue gas and therefore higher energy efficiency in a condensation cooler.

Air Distribution

The combination of low excess oxygen, a good burn-out of carbon substances in the flue gas, low NOx, and clean ash is a very unique feature for the present invention. This is realized as the necessary air for complete combustion is used for two processes only:
Char conversion (primary air)
Gas combustion (secondary air)
while drying and pyrolysis are driven by energy from radiation from gas combustion and convection from the hot gas in the char gasifier.

Hereby, each active oxygen molecule is used either for burning out de-volatilized char or for oxidizing gas components.

Steam Content in Flue Gas

A main advantage in the present invention is the high steam content in the flue gas. The advantages of a high steam content have already been described (radiation properties improved, recovering of heat in condensing unit improved, soot formation prevented, limitation of temperature and hence NOx formation, etc.).

A steady high steam content, such as 20% or higher on weight basis, can be maintained in the system due to the sprinkler system, which can be activated when the water content in the fuel is lowered. Further, use of moisturized air for combustion increases the steam content in the flue gas.

Carbon Content in the Ash

In the present invention, an updraft gasification principle is used for converting char into burnable gas and ash. This leads to a high char burn: The carbon content in the ash is less than 10%, or even below 5%.

To reduce sintering, moisturized air can be used, or steam can be added in the bottom of the reactor.

Ash Removal System

A main advantage of the invention is the high char burn-out and the simplicity of removing the ash. In grate systems and in fluid-bed systems, the ash removal systems are costly and complicated, whereas according to this invention the ash removal system is technically easy to embody and cheap.

In the present invention, the ash can easily be removed e.g. by one or several screws.

No (or Limited) Moving Part in the Reactor and in the Hot Stages

A major advantage of the present invention is that there is no grate for the drying, pyrolysis, char oxidation and char gasification stages. Ideally, the system consists of the following moving parts:
Feeder (below 100° C.)
Ash screw (ash is below 300° C.)
Air blower (below 50° C.).

However, for some types of plants according to the present invention and/or types of fuels, it may be an advantage to have one or several stirrers/pushers to move biomass/ash from one reaction stage to the other.

In addition, for some plants according to the present invention, it might be an advantage to have one or several thermocouples or other sensors that for lifetime reasons are moved into the hot stages during longer or shorter periods.

Shapes

The thermal reactor is divided into stages in the vertical direction. The various stages include (from below and up):
Ash burn-out
Char oxidation and gasification
Pyrolysis
Drying
Gas combustion.

The gas combustion stage functions both as gas burner and heat source for the top layer of the updraft gasifier.

According to the invention, the stages can be partly horizontally divided, i.e. the drying section could be close to the feeder, and the pyrolysis stage could be horizontally away from the feeder. Such a shape will keep pyrolysis gases away from the feeder, and it will keep the feeder section cool (below 200° C.).

The height of the thermal reactor may differ from a few meters for small plants to more than 8 meters for large plants.

In the horizontal plane, the thermal reactor is preferably round or rectangle.

The solid bed as well as the gas combustion part may have different dimensions. For instance, the bottom part of the thermal reactor may have one diameter, and higher up in the drying/pyrolysis region, it may be wider, and above in the gas combustion stage, the thermal reactor may be even wider.

Size of Plants

Typically, these types of plants will be between 1-20 MW thermal input, but they may be both smaller and larger.

A typical design parameter is that there shall be about 1 m2/MW fuel input in the gasification section and about 2 seconds retention time of the gases in the gas combustion section.

Turn Down Ratio

Another important feature of the present invention is the high turn-down ratio. Depending on the design and fuel, the invention can be used to design thermal reactors with a turn-down ratio of 1:10 or even below e.g. 1:20.

Easy to Regulate

Another important feature is that the system is also very easy to regulate.

Bed Height

It is desirable to have an even bed height. Therefore, a registration system of the bed height shall be installed, which shall interact with the feeding system.

The bed height can be registered by sensors such as radar, ultrasonic or gamma measurements.

Also the bed height can be indirectly registered by use of thermocouples:

At feeder: The drying and pyrolysis stage receives heat in terms of radiation from the gas combustion stage above. When there is a normal fuel layer in the drying and pyrolysis stage, the bottom at the feeder is cool, whereas when the fuel layer in the drying and pyrolysis stage is low, the bottom will be warm. The thermocouple will then give signal to the feeding system that fresh (cold) fuel needs to be filled in.

Opposite the feeder: By registering the thermal reactor wall temperatures at different heights the approximate height of the fuel layer can be determined: The thermal reactor walls where the gascombustion takes place will be warmer than the thermal reactor walls where the top of the fuel layer is.

Ash Removal

In the bottom of the gasifier, the ash is removed, and oxygen (air) is injected into the burn-out layer. The ash removal system is activated when the char in the ash is burned out. When the ash layer contains char, the char will oxidize, and the ash will be warm. When the char is fully burned, the ash will be cold. Thus, temperature measurements right above the oxygen (air) inlet can indicate if the char is fully burned and then activate the ash removal system.

Oxygen for gasification and for gas combustion.

The stoichiometric ratio for the thermal reactor is app. 1.2-1.3 corresponding to an oxygen content in the flue gas of about 4-5% (dry basis). The air blower(s) will be controlled to ensure this oxygen amount.

The oxygen is distributed to the gasification reactor and the gas combustion stages.

The gasification reactor operates with a stoichiometric ratio of 0.2-0.25, so about 15-20% of the oxygen is led to the ash burn-out stage and the rest to the gas combustion stage.

Water for Temperature Control

As described previously, water can be used for temperature control of the gas combustion stage.

Cheap, Simple and Compact

As described above, the system offers a number of advantages compared to state-of-the-art combustion technologies. It could therefore be expected that the system will be expensive and complicated. However, the simplicity and the compactness of the system is a main advantage of the invention.

Pressure of System

Typically, the pressure of the system will be atmospheric, but the system can be built for both underpressure and overpressure.

Materials

Typically, a system will be built of high-temperature materials such as bricks and insulation blocs inside, followed by insulation and a steel vessel.

BRIEF DESCRIPTION OF THE DRAWINGS

The invention, and in particular preferred embodiments thereof, is presented in more detail in the following, referring to the drawings where FIG. 1 schematically illustrates how the basic process steps of the thermal reactor according to the invention interact.

DETAILED DESCRIPTION OF THE PREFERRED EMBODIMENTS

Figure 1:
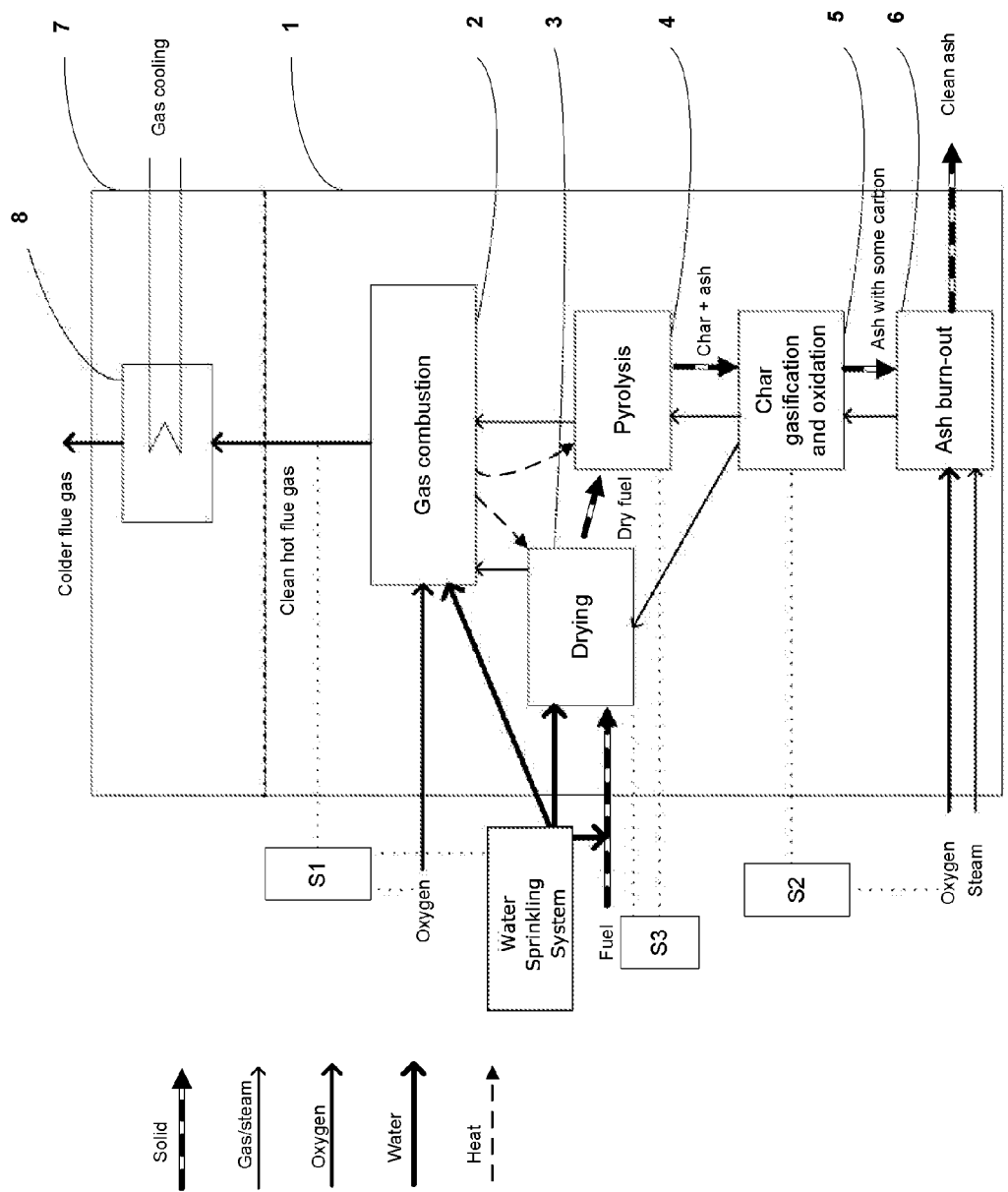

In FIG. 1, 1 is a unit or reactor to which fuel is added. The fuel is converted thermally by addition of air (and/or oxygen). Thus, a warm gas is produced in the thermal reactor 1. The fuel added to unit 1 is solid, e.g. biomass, waste or coal. If the thermal reactor 1 is designed for fuels with low calorific power, e.g. wet fuels, and if the added fuel has a higher calorific power, the temperature in the unit or in the Generator 1 can be adjusted by adding water to the fuel, the drying stage 3, the pyrolysis stage 4 and/or gas combustion stage 2.

The fuel is dried and pyrolised (de-volatilized) by convection and radiation from the combustion stage 2 and by convection from the gases from the gasification and oxidation stage 5.

Key parameters of the gas combustion stage, such as temperature, NOx and CO, can be controlled and adjusted by regulating the oxygen and the water addition according to the measurements of the sensor (S1).

The de-volatilized fuel is gasified and oxidised in stage 5, and a final ash burn-out is done in stage 6, in which oxygen and possibly also steam is injected.

The ash removal system can have a simple regulation based on a temperature sensor in a short distance of the oxygen inlet. When the ash around the temperature sensor is without char, the air will cool the sensor, and ash removal shall be activated. The warm oxidation stage above will then move downwards, and when the temperature sensor registers a temperature increase, the ash removal system shall stop.

The feeding system can also be regulated by one or a few temperature sensors. Thermocouples can be integrated in the floor of the drying and pyrolysis stages and/or in the wall on the opposite side of the feeder. A temperature increase of the floor close to the feeder will indicate that there is no (or very little) biomass on the floor, so the temperature increase will give signal to the feeder to start. As the temperature in the gas combustion section is higher than the temperature in the solid fraction thermocouples on the opposite side of the feeder can be used to register the bed height.

Alternatively, a bed height instrument can be used, e.g. radar, ultrasonic, IR camera or such can be used.

The gas leaves the combustion stage well above 900° C. The gas is then cooled in one or several gas coolers 8, which can be integrated in the thermal reactor or in following stages.

Figure 2:
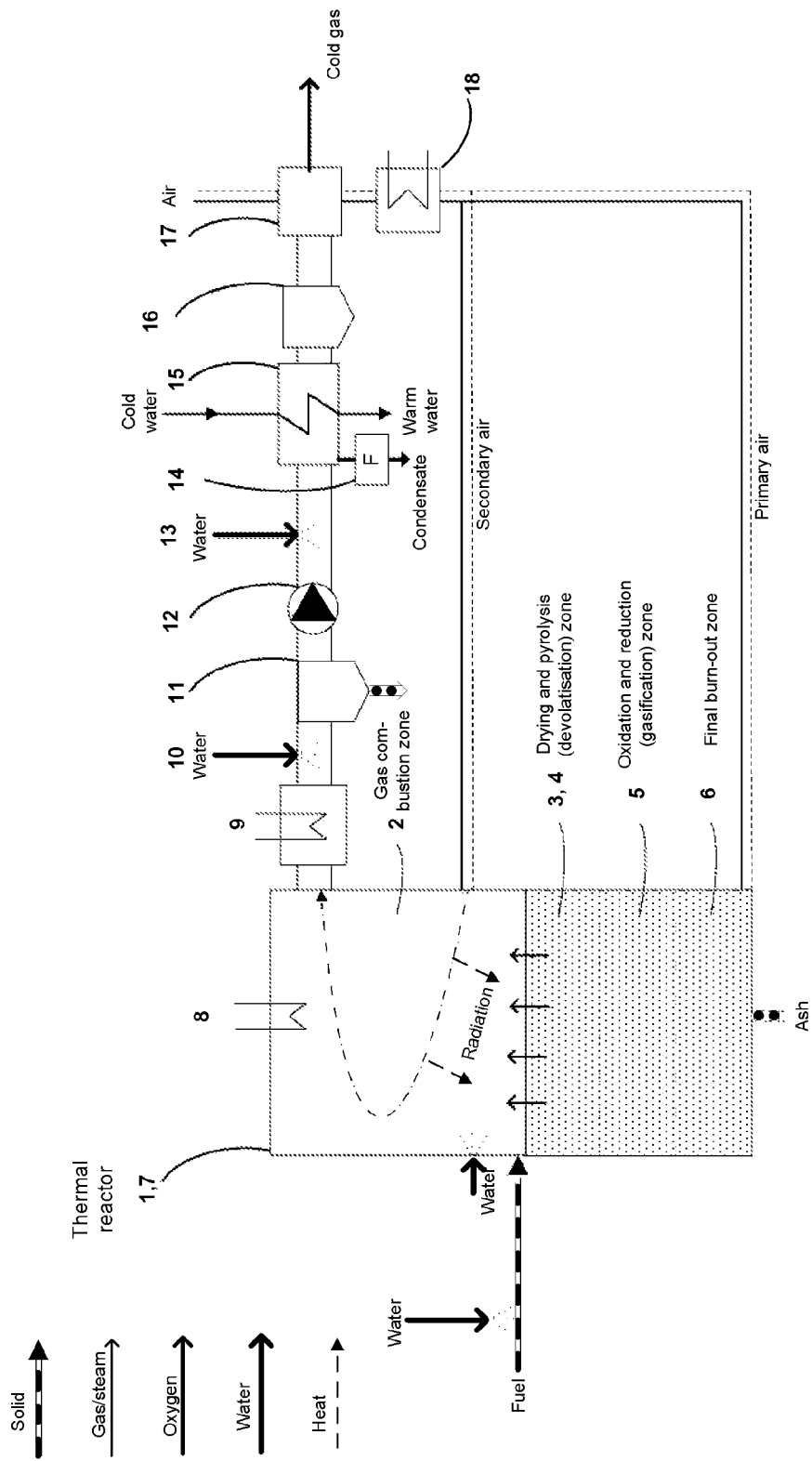
FIG. 2 schematically illustrates the basic process steps of a heating plant that produces hot water according to the invention.

In FIG. 2, an energy plant, producing varm water, is schematically illustrated, It is illustrated how the drying 3, pyrolysis 4, gasification and oxidation 5 and the ash burn-out 6 stages are connected so as to be coherent in vertical direction within the thermal reactor 1.

It is also illustrated how the gas combustion stage delivers energy to the top of the fuel due to radiation.

8 is an internal heat exchanger, e.g. water and/or thermal oil panels or a steam/helium super heater, whereas 9 is a gas cooler downstream the thermal reactor.

10 is water injection for further cooling of the gas, 11 is a filter and 12 is a blower. 13 is water injection which can be used to cool the gas to below 100° C. 15 is a condensing heat exchanger where water is heated, while the flue gas is cooled and water vapours condensate.

17 is an enthalpy exchange system, where the air is moisturized and heated while the flue gas is cooled and de-moisturized. In 18, the air is preheated before it is led to the thermal reactor 1.

Figure 3:
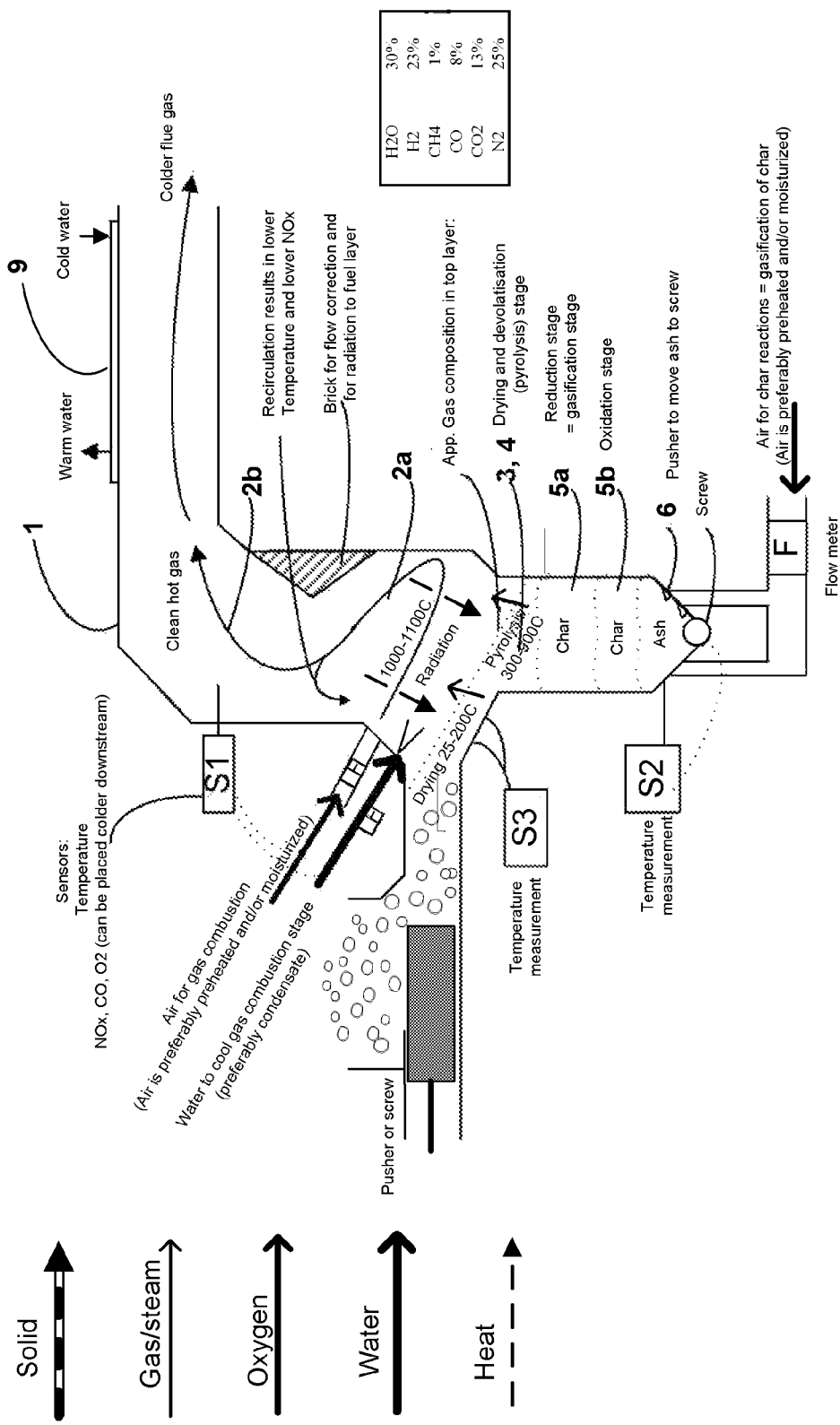
FIG. 3 schematically illustrates a thermal reactor and a radiation gas cooler according to the invention.

FIG. 3 is a schematic drawing of a thermal reactor as illustrated principally in FIG. 1 and FIG. 2.

In the bottom of the reactor, air is led to the ash burn-out stage 6 on both sides of the ash screw. Ash pushers move the ash towards the screw. A flow meter measures the air inlet to secure that about 20% of the total air amount is led to the ash burn-out stage. A thermocouple (sensor S2) registers the temperature and activates the ash screw, when the temperature decreases to the set point, i.e. 200° C.

The air is oxidized in the oxidation stage 5*b*, and the hot gases (CO2 and H2O) gasify the char in the gasification stage 5*a*. Above are the drying and pyrolysis stages. One or several temperature sensors are placed in the floor (S1), so when the floor temperature increases as the pyrolysis stage moves upwards towards the feed, the feeder will be activated and push in some fresh fuel.

The gas combustion stage 2 is formed with a primary combustion stage 2*a* where the fresh air meets and mixes with the gasification gas and combusts efficiently in the temperature region of 1000-1100° C. The hot gases radiate to the bed and hereby cool the gas and heat the bed. A flow correction "nose" is placed on the wall opposite the nozzle side in such a way that there is a back mixing of the gas leaving the primary combustion chamber and in such a way that the lower (and warmest) side of the "nose" radiates to the top of the bed. After the primary combustion stage is the gas burn-out stage 2*b*, where the remaining CO, hydrocarbons and dioxins are burned out, resulting in a very low CO emission, i.e. below 500 mg/Nm3, even below 300 mg/Nm3.

Again, the separate stages, drying (3), pyrolysis (4), gasification and oxidation stage (5) and burn out stage (6), are separate and coherent.

Figure 3A:
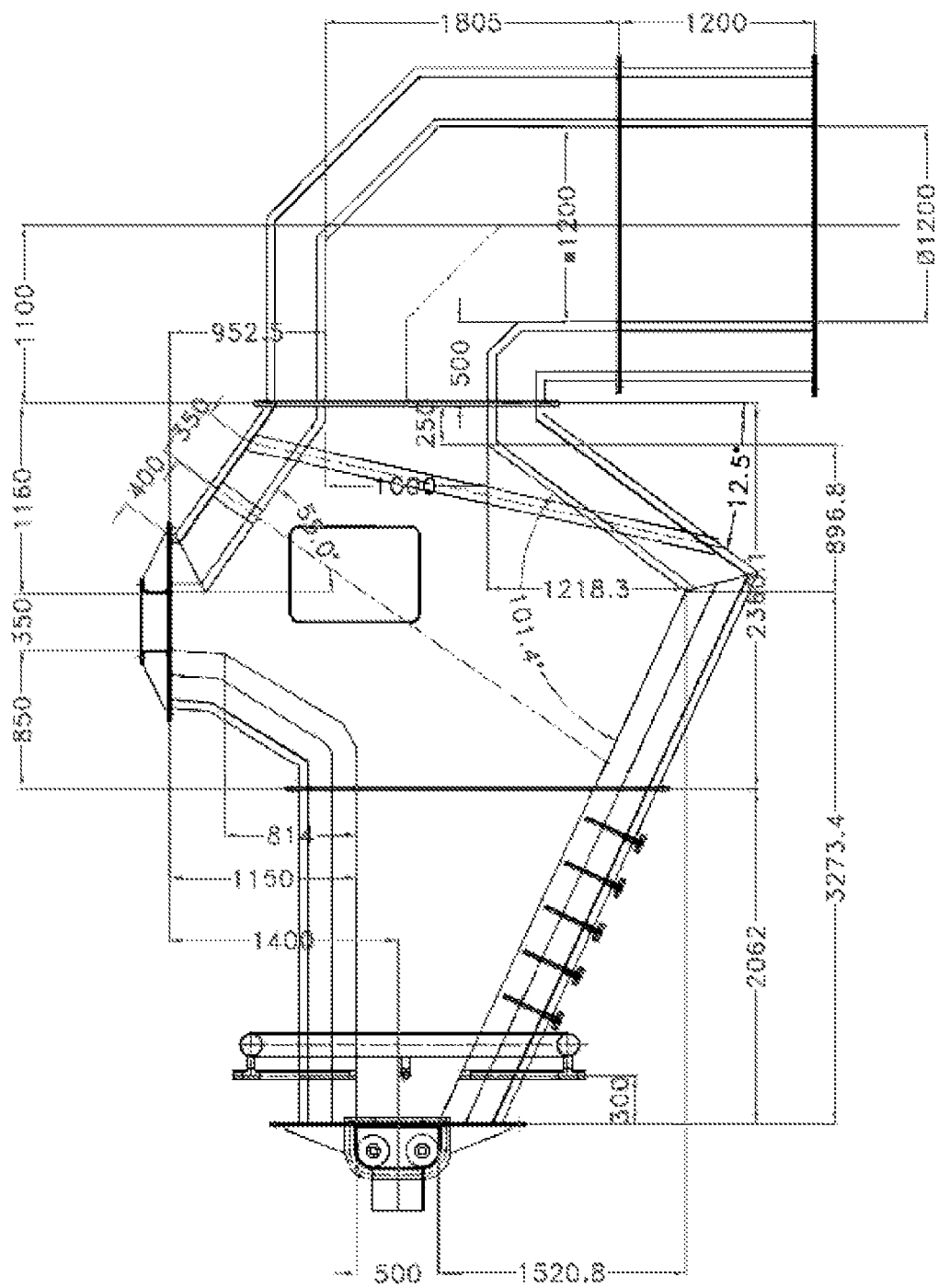
FIG. 3*a* illustrates a thermal reactor in the size of 2 MW thermal input of wood chips. Dimensions in mm.

FIG. 3*a* illustrates a cross section of a thermal reactor of about 2 MW thermal input of wood chips. It is seen that the thermal reactor is divided in 4 physical parts and therefore easy to manufacture and transport to the site where is shall operate.

The fuel is screwed into the reactor in the opening on the left. The fuel will due to gravity fall towards the bottom of the reactor. The left side wall is vertical, which will minimize bridging. To further prevent bridging a low frequency vibrator can be placed on the thermal reactor.

Two screws are used, and hereby it is not necessary with pushers to move the ash to the screws.

The thermal reactor consist of (from out and in): Steel casing, insulation, refractory lining.

Thermocouples across from the feeding section are placed in the refractory lining in order to indicate where the fuel layer is.

Moisturized primary air is injected in about 12 nozzles in the bottom, while secondary air is injected in about 3 nozzles about 400 mm above the feeder pointing about 35 degrees down.

Figure 4:
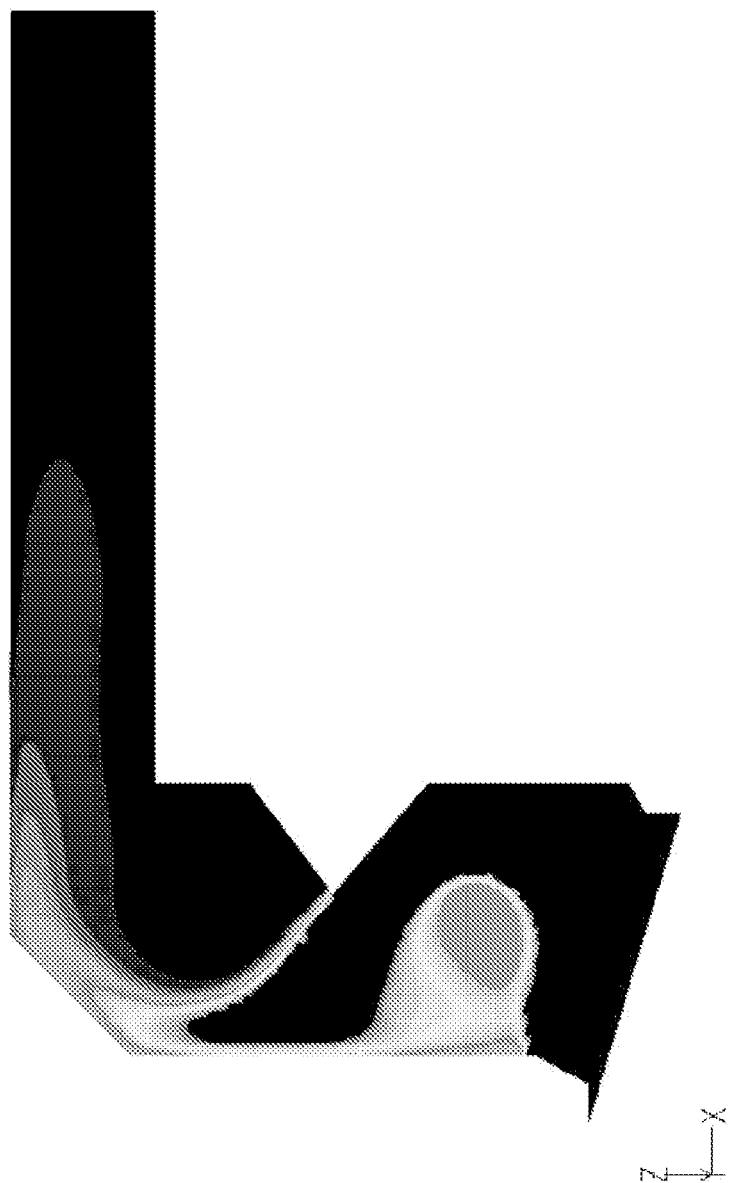
FIG. 4 schematically illustrates the CO content in the flue gas in the thermal reactor according to a CFD simulation of the gas combustion.
Figure 4:
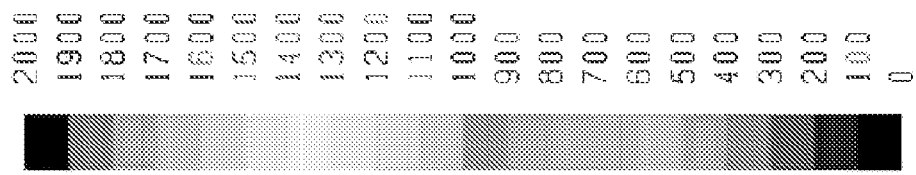
Figure 4A:
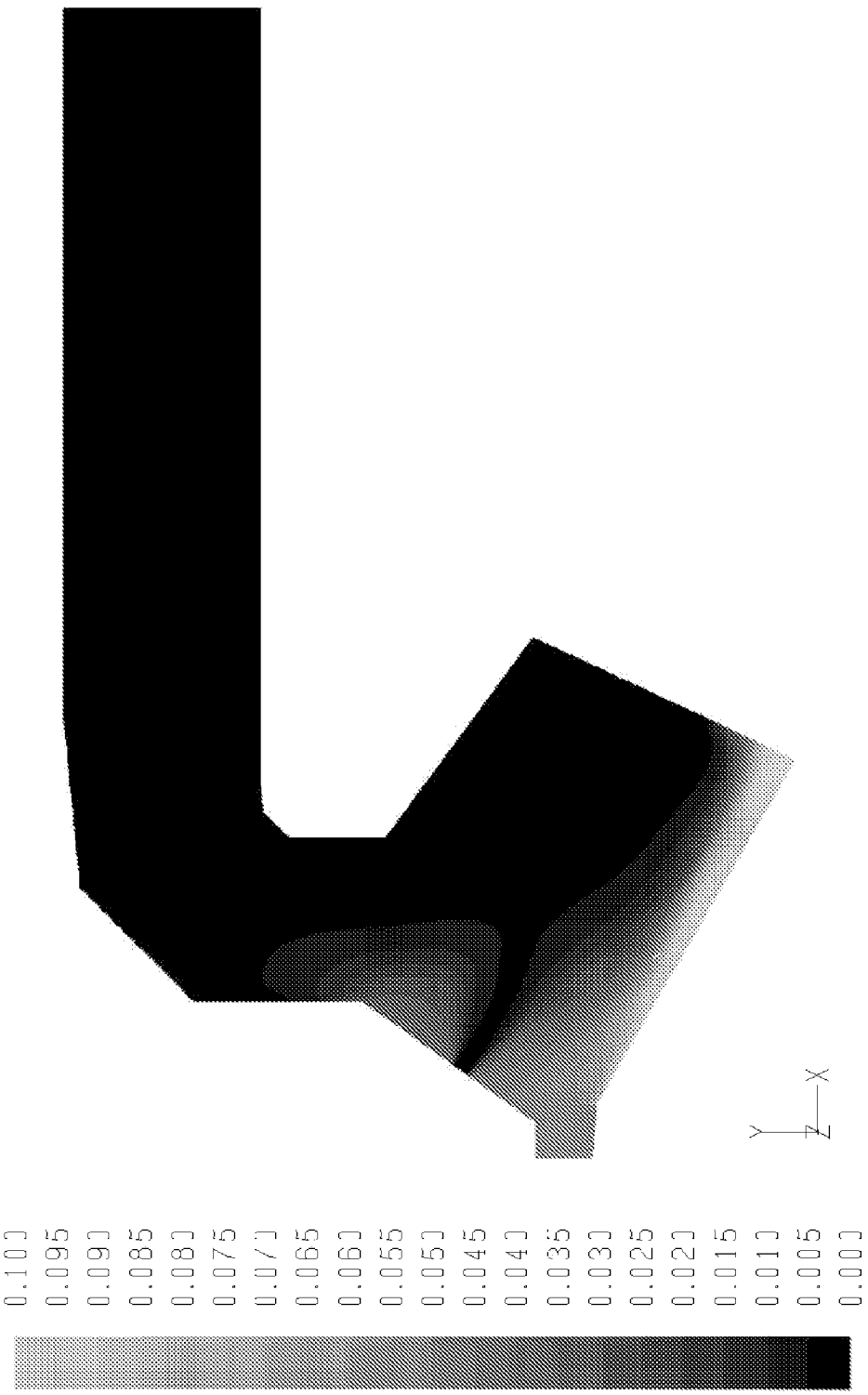
FIG. 4*a* schematically illustrates the CO content in the flue gas in the thermal reactor according to a CFD simulation of the thermal reactor in FIG. 3*a*.

In FIGS. 4 and 4*a* are diagrams of the local CO content in the gas combustion stage 2. The diagram is a result of a CFD simulation according to which the CO content will be below 100 ppm after the gas combustion stage.

The secondary combustion air enters the gas combustion stage in three nozzles each with a diameter of 120 mm, with a speed of app. 20 m/s.

Figure 5:
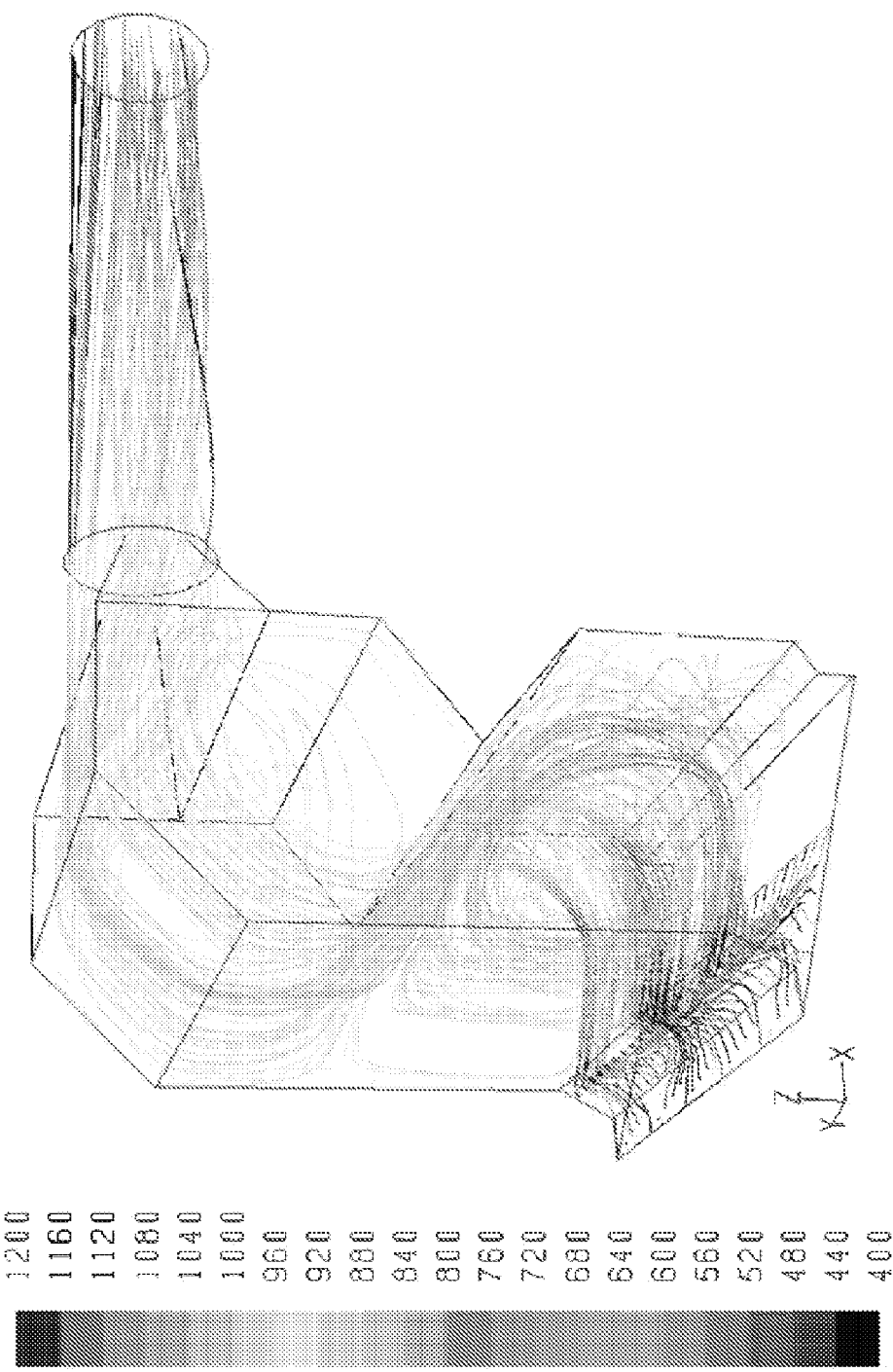
FIG. 5 schematically illustrates flow pattern and temperatures in the flue gas in the thermal reactor according to a CFD simulation of the gas combustion.
Figure 5A:
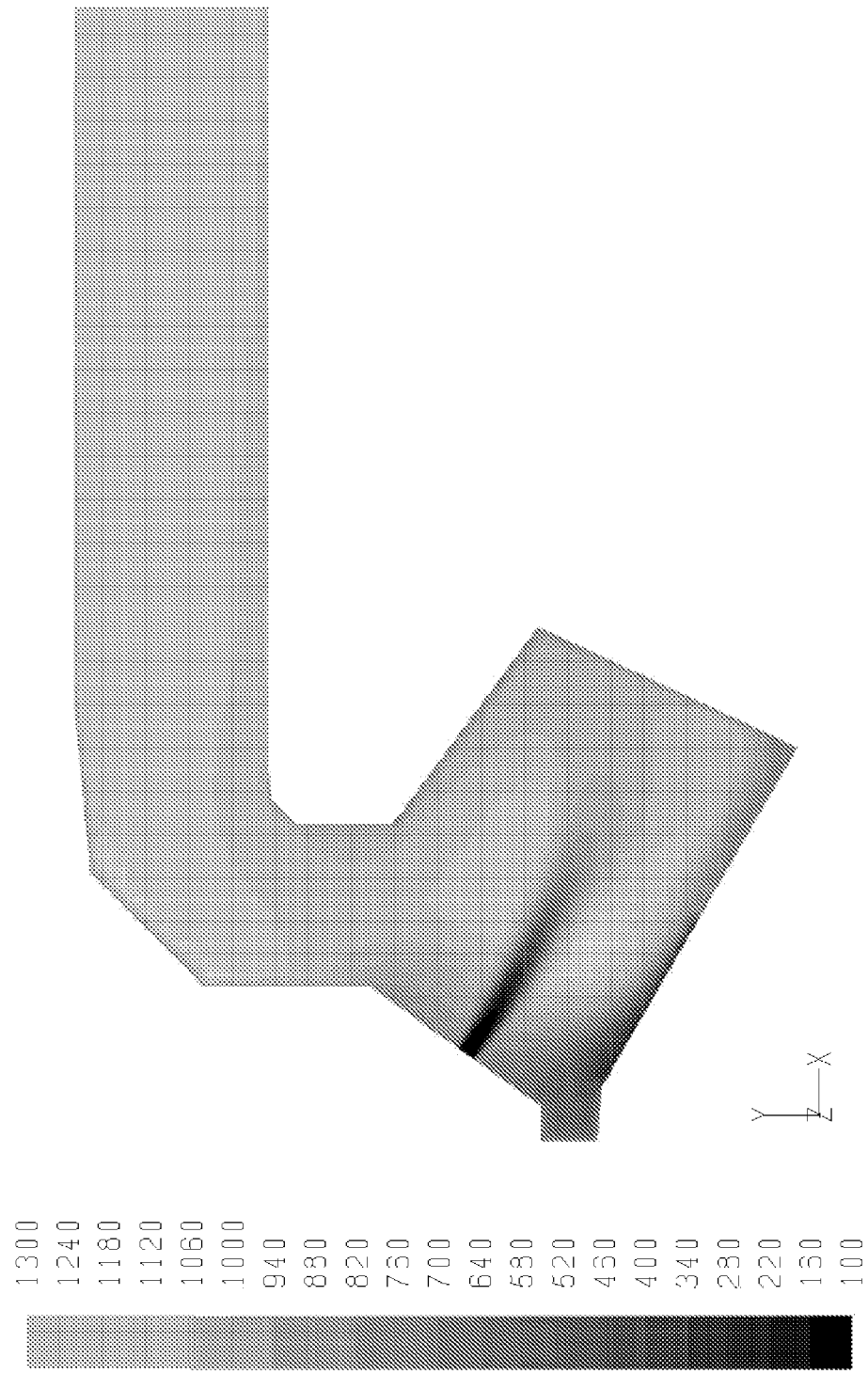
FIG. 5*a* schematically illustrates temperatures in the flue gas in a thermal reactor according to a CFD simulation of the thermal reactor in FIG. 3*a*.

In FIG. 5 is a diagram of the local temperatures and direction of the gas in the gas combustion stage 2. The diagram is a result of a CFD simulation according to which the temperatures will be within the 700-1100° C. region, which will prevent high amounts of thermal NOx. The diagram shows that there will be a good back mixing.

Figure 6:
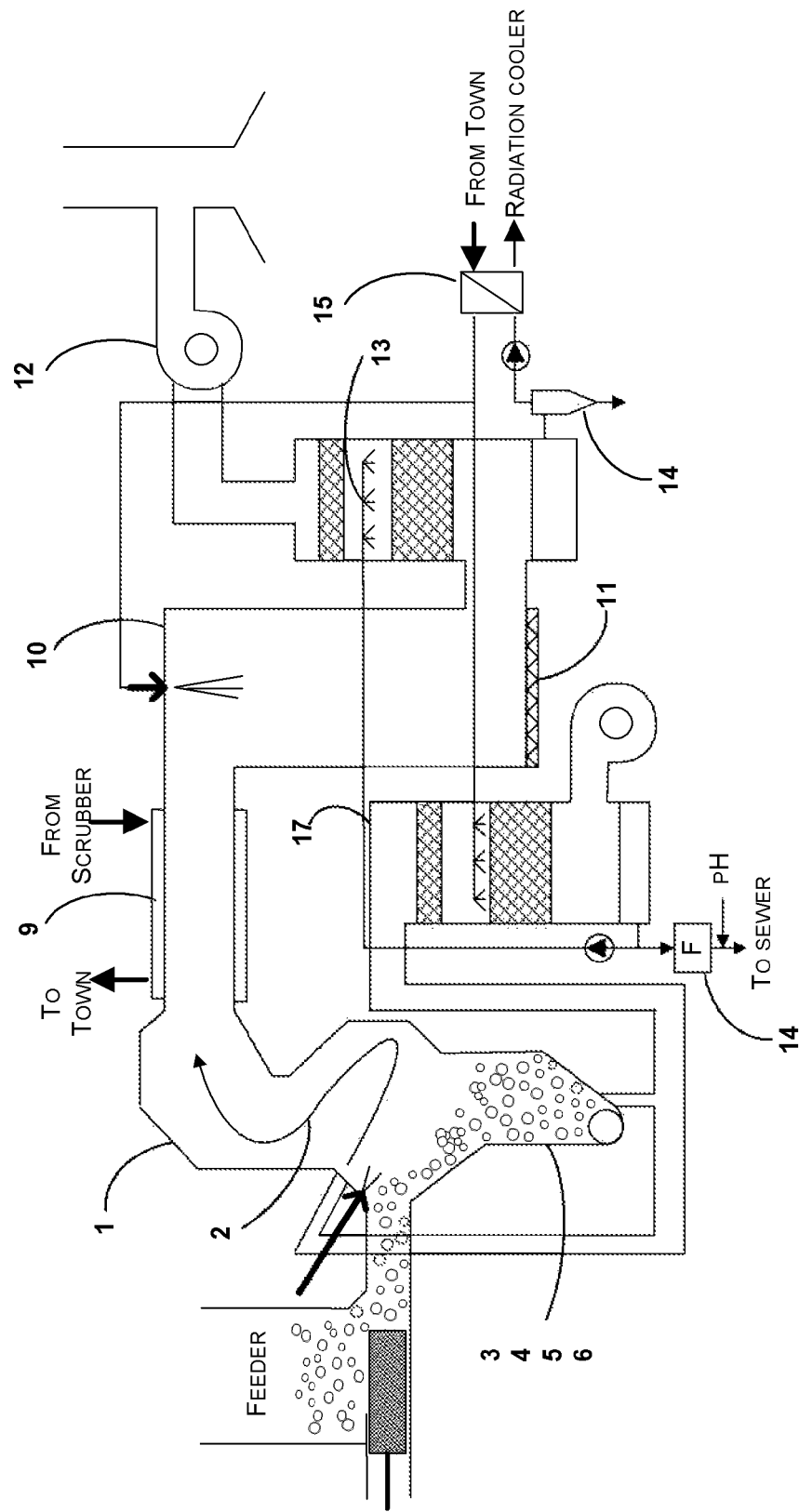
FIG. 6 schematically illustrates a heating plant that produces hot water according to the invention.

In FIG. 6 is a schematic diagram of a heating plant that produces hot water according to the invention. FIG. 6 illustrates the reactors described in FIG. 2.

In the thermal reactor 1 the ash screw is placed in one side of the reactor. Air is only led to one side of the screw. After the combustion chamber 2 is a radiation cooler 9. After the radiation cooler is an evaporative cooler 10, in which the gas is cooled to below 400° C., and where particles are collected and removed by a screw 11. Scrubber water cools the gas further in 13, and the gas is pumped by a pump 12. Particles are removed from the scrubber water by a hydro cyclone 14, and heat is recovered in a heat exchanger 15. Combustion and gasification air are moisturized and heated in the air moisturizer 17, while the scrubber water is cooled. Excess water (condensate) is cleaned in the filter 14.

Figure 6A:
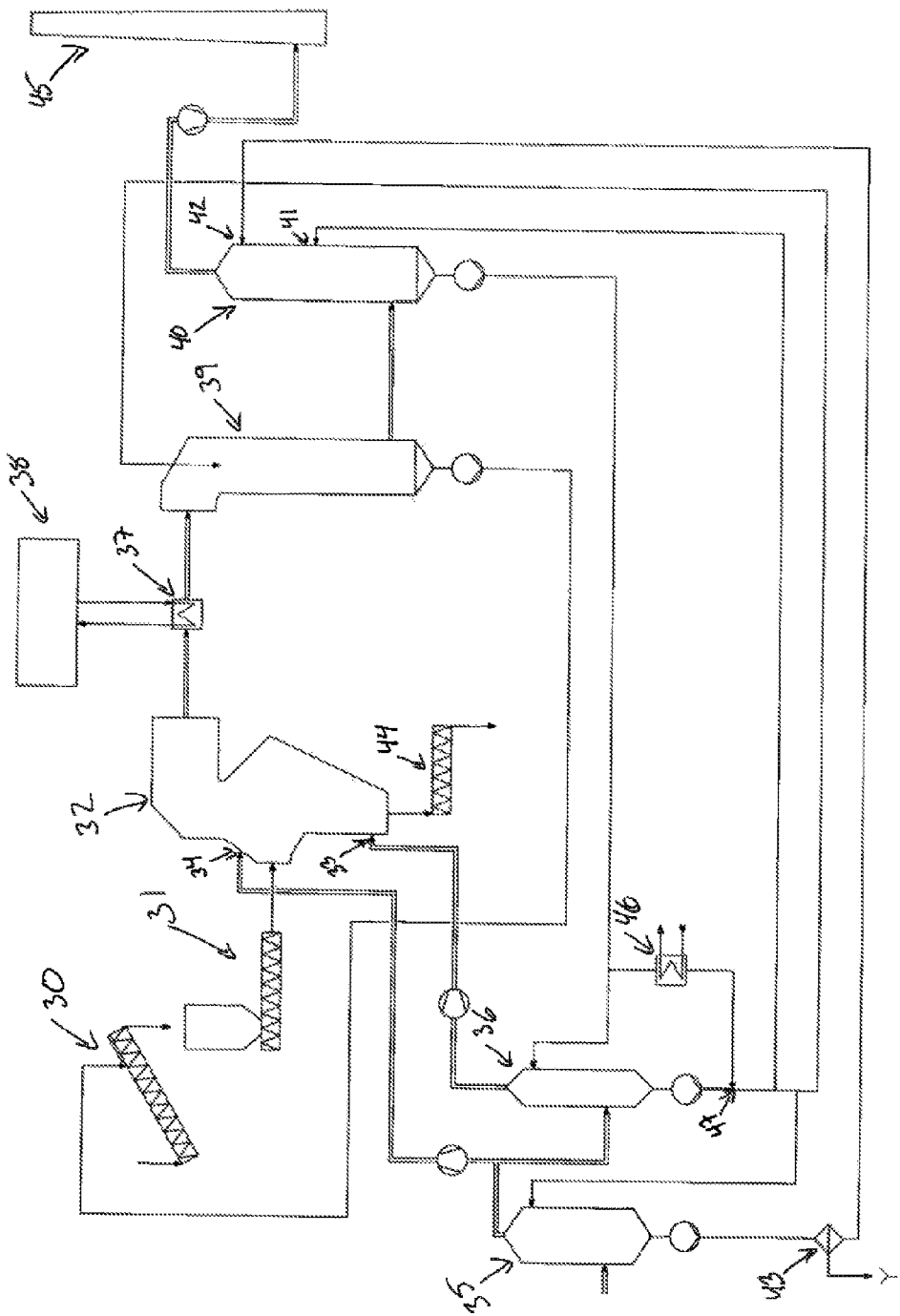
FIG. 6*a* schematically illustrates a heating plant that produces hot water according to the invention.

FIG. 6*a* shows a full schematic overview over an embodiment of the invention where the invented system combustion is used. In this embodiment a feed system comprising a fuel storage unit (30) and a fuel feeding means (31) is feeding fuel to a thermal reactor unit comprising a thermal reactor (32). To the thermal reactor (32) are two inlets connected feeding moisturizer air or oxygen to the thermal reactor (32). The moisturized air is distributed both at the bottom (33) of the thermal reactor and above the point of fuel feeding (34). At the bottom of the thermal reactor is an outlet (44) for taking out ash into for example a forest, fields or to deposits. The moisturized air or oxygen comes from a moisturizing system comprising two air moisturizing means (35, 36), working using the same principles as a scrubber. These two air moisturizer means (35, 36) are serial connected. Here the main moisturizer (35) distributed moisturized air both to the air inlet (34) above the feeding inlet at the thermal reactor (32) and to an air moisturizing booster (36) which further moisturizing the air before being injected at a point in into the bottom (33) of the thermal reactor (32).

Hot exhaust gas created in the thermal reactor (32) will go through a heat exchanger unit (37) that is connected to an energy extraction device (38) which could produce both or either of electric energy and energy for district heating. The hot gas will than continue into the scrubber system where it first enters the quench (39) where water from the air moisturizer booster (36) is used to cool down the exhaust gas before entering the scrubber (40). Rests of the scrubber water will be collected together with particles and salts at the bottom of the quench (39). This slag will be sent back to the fuel storage (30) to be feed back into the system; this loop is what previously has been called the first stream. The cooled exhaust gas will then continue into the scrubber (40) where water will be sprayed on the gas at two different points. The first point (41) is with water from the air moisturizer booster (36) and condensate from (46) and at the second point (42) with, by filtration (43), highly cleaned water from the main air moisturizer (35). The clean and cooled gas will then be connected to a chimney (45) while the rest of the scrubber water which consists of a large quantity of water and a small concentration of particles and salt will go back to the air moisturizing unit closing the second stream. Part of the scrubber water from the scrubber (40) will be used untreated in the air moisturizer booster (36) and the rest of the scrubber water will go through a heat exchanger (46) for extracting energy which could be used for district heating. The water is than re-connected back to the second stream at a point (47) after the air moisturizer booster (36). Part of the water from the booster mixed with the water from the heat exchanger is than feed into the main air moisturizer (35) while the rest is connected back to the scrubber (40). The second stream therefore has a single water channel from the scrubber (40) to the air moisturizer unit but two water channels back to the scrubber unit. One distributing water to the quench (39) and the first injection point (41) at the scrubber (40) and one with highly cleaned water injected at the second point (42) at the scrubber (40). If needed highly cleaned water could be taken out from the second stream after the main air moisturizer (35) at the point of filtration (43).

Figure 7:
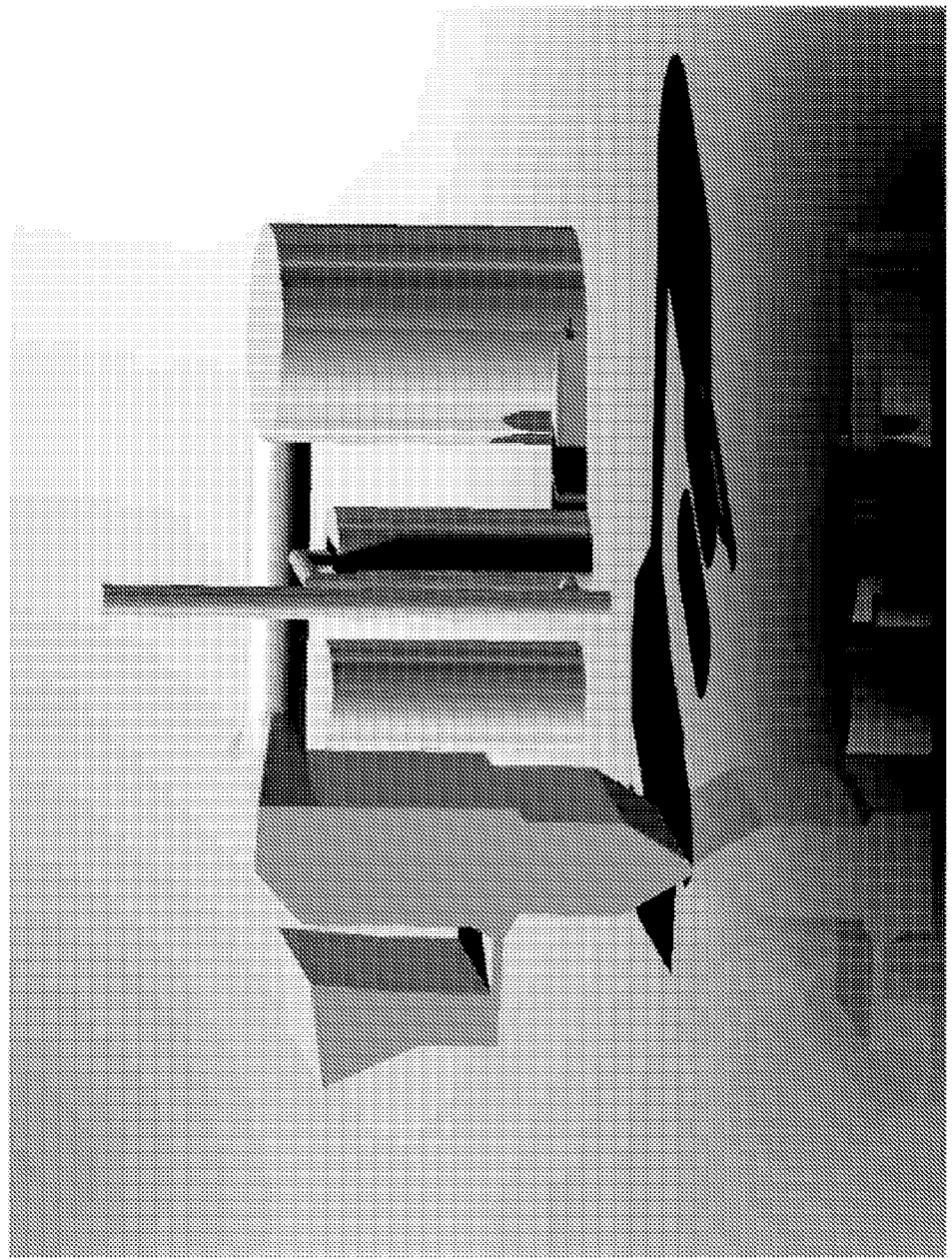
FIG. 7 schematically illustrates a 3-D layout of a heating plant that produces hot water according to the invention.

In FIG. 7 is a schematic 3-D illustration of a layout of a heating plant that produces hot water according to the invention. It is an illustration of the plant in FIG. 6. The thermal reactor is rectangle in the horizontal plane; the radiation cooler, the evaporative cooler, the gas scrubber and the air moisturizer are round.

Figure 7A:
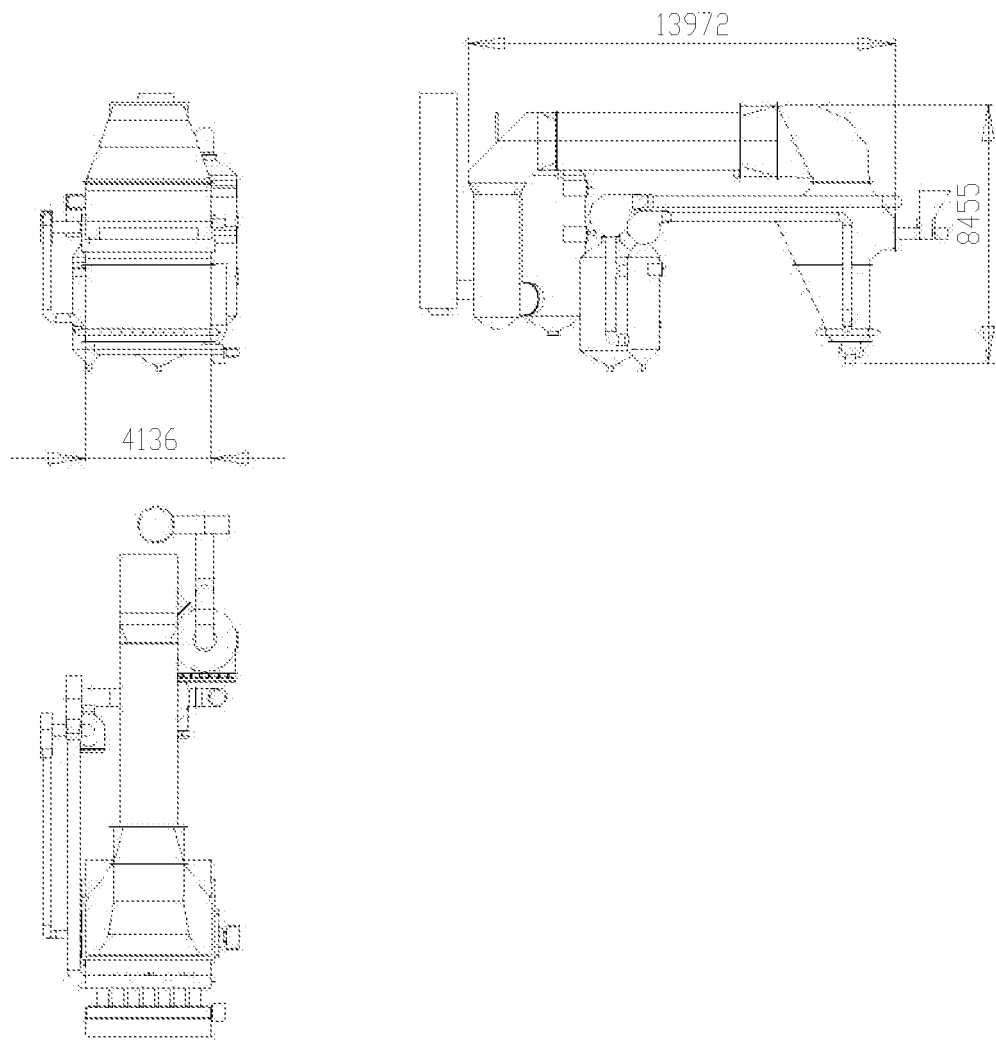
FIG. 7*a* schematically illustrates a 3-D layout of a heating plant of 5 MW thermal input of wood chips according to the layout of FIG. 6*a*.

In FIG. 7a is a schematic 3-D illustration of a layout of a 5 MW thermal input heating plant that produces hot water according to the invention. It is an illustration of the plant in FIG. 6a. Measures are in mm.

Figure 8:
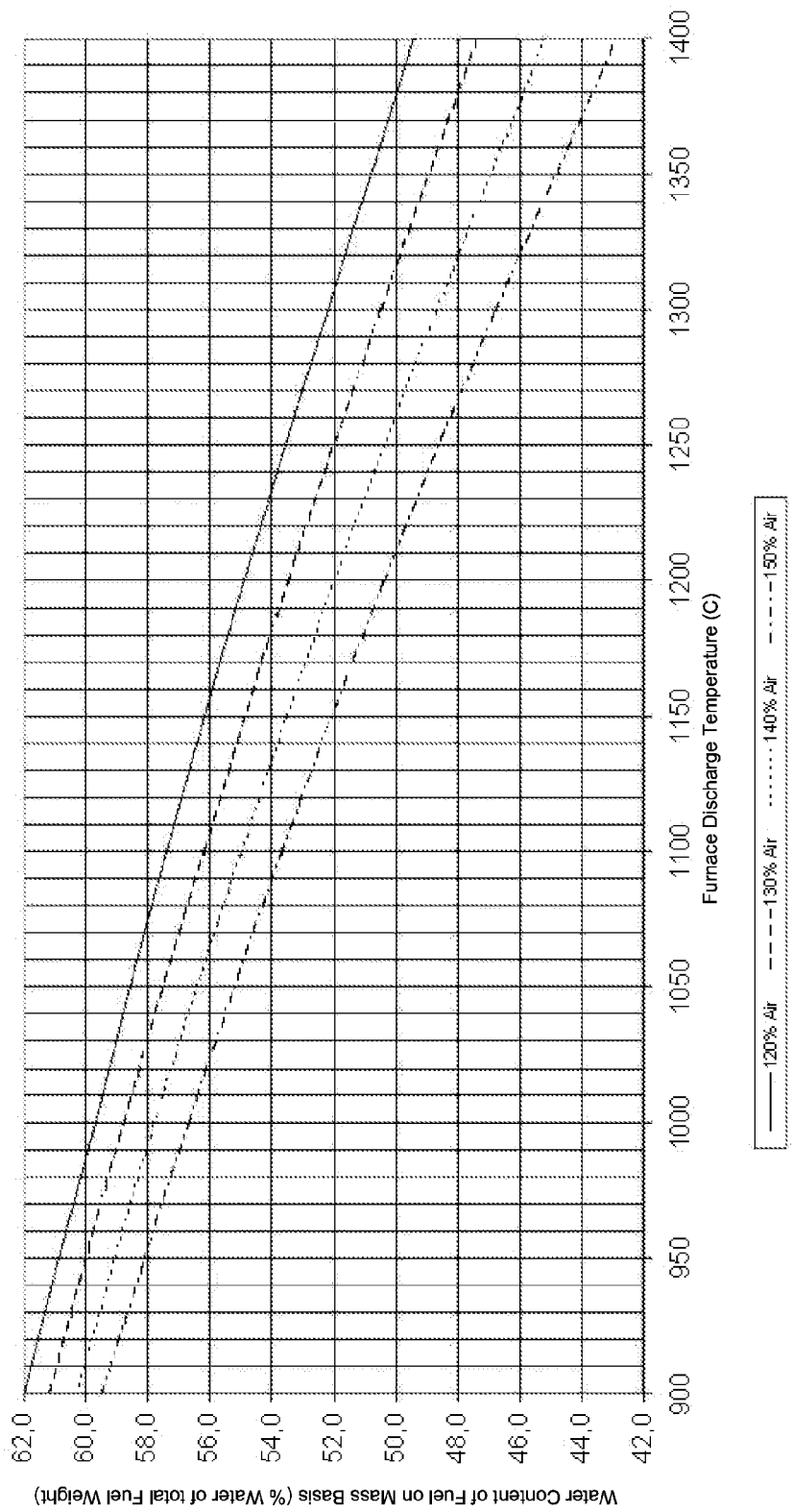
FIG. 8 illustrates the adiabatic temperature of the gas combustion stage, depending on moisture content in fuel and excess air ratio.

FIG. 8 illustrates the adiabatic temperature of the gas combustion chamber depending on water content of the fuel and surplus air. The diagram show that fuels of moisture content of 52-58% of water is very suitable. For dryer fuels some sort of cooling must be arranged which can be water addition or active cooling of the thermal reactor.

The invention claimed is:

1. A method for converting a solid carbonaceous fuel into flue a gas and ash, said method comprising heating the fuel at separate coherent stages to temperatures causing the fuel to decompose into gaseous and solid components, the stages comprising:
 a pyrolysis stage, in which the fuel is pyrolysed without addition of oxygen,
 a gasification and an oxidation stage, in which char is converted to gas,
 an ash burn-out stage to which oxygen is supplied, and
 a gas combustion stage to which oxygen is supplied, wherein the fuel at the pyrolysis stage is heated by the gases formed in the gasification stage, the oxidation stage and the gas combustion stage, wherein said solid carbonaceous fuel is converted into the flue gas and ash in a system comprising:
I. a thermal reactor comprising i) an updraft gasification reactor for conversion of solid fuel into a burnable gas, wherein the updraft gasification reactor is configured as a moving-bed reactor having a drying stage, a pyrolysis stage, a char gasification and oxidation stage and an ash burn-out stage and ii) a gas combustion stage within the thermal reactor positioned directly above the updraft gasification reactor; and
II. a plurality of nozzles configured to feed oxygen to the ash burn-out stage and to the gas combustion stage so that the gases produced in the updraft gasification reactor are converted into the flue gas, which has a NOx content below 300 mg/Nm3, CO content below 500 mg/Nm3, and oxygen content below 5% by weight,
III. wherein heat is provided to the pyrolysis and drying stages in the updraft gasification reactor by radiation and convection from the gas combustion stage above the drying stage and by convection from the gasification and oxidation stage below the drying stage.

2. The method according to claim 1, wherein the a drying stage is arranged upstream of the pyrolysis stage.

3. The method according to claim 1, wherein gas produced in the pyrolysis stage is combusted proximal to the top of the solid fuel.

4. The method according to claim 1, wherein water is added to the fuel, the drying stage, the pyrolysis stage or the gas combustion stage such that the temperature of the flue gas produced in the gas combustion stage is reduced to a temperature that reduces NOx formation or such that the steam content of the flue gas is kept high.

5. The method according to claim 1, wherein the amount of oxygen in the gas combustion stage is regulated by a sensor (S) such that the plant is within the limits or set point of the temperature, NOx, CO or $O_2$.

6. The method according to claim 1, wherein the flue gas is cooled either within the thermal reactor or downstream the thermal reactor.

7. The method according to claim 1, wherein energy obtained in the gas cooler is used for energy production.

8. The method according to claim 1, wherein the oxygen injected into the gas combustion stage is air or oxygen enriched air.

9. The method according to claim 1, wherein the oxygen injected into the gas combustion stage is injected horizontally or pointing downwards.

10. The method according to claim 1, wherein the oxygen injected into the gas combustion stage is moisturized.

11. The method according to claim 1, wherein the oxygen injected into the gas combustion stage leaves the air nozzles at a speed between 10-40 m/s.

12. The method according to claim 1, wherein the system further comprises walls in the gas combustion stage that are formed in such a way that the flue gas back-mixes into the oxygen supply.

13. The method according to claim 12, wherein the walls in the gas combustion stage are formed in such a way that radiation from the wall to the surface of the carbonaceous fuel is generated.

14. The method according to claim 1, wherein the oxygen injected into the ash burn-out stage is moisturised air or wherein the steam and air are injected separately.

15. The method according to claim 1, wherein an amount of air injected into the ash burn-out stage results in a high temperature in the oxidation stage.

16. The method according to claim 1, wherein an amount of air injected into the ash burn-out stage corresponds to a stoichiometric ratio of 0.15-0.25 (air to full burn-out of the fresh fuel), or the air results in a lowered temperature in the ash burn-out stage.

17. The method according to claim 1, wherein water and/or steam added to the thermal reactor are condensated from the heat exchanger unit.

18. The method according to claim 1, wherein the diameter in the thermal reactor differs at each stage.

19. The method according to claim 1, wherein contaminants in the gas are reduced.

20. A system for converting a solid carbonaceous fuel into hot flue gas and ash with carbon content, said system comprising:
a thermal reactor comprising i) an updraft gasification reactor for conversion of solid fuel into a burnable gas, wherein the updraft gasification reactor is configured as a moving-bed reactor having a drying stage, a pyrolysis stage, a char gasification and oxidation stage and an ash burn-out stage and ii) a gas combustion stage within the thermal reactor positioned directly above the updraft gasification reactor; and
a plurality of nozzles configured to feed oxygen to the ash burn-out stage and to the gas combustion stage so that the gases produced in the updraft gasification reactor are converted into a flue gas including NOx content below 300 mg/Nm$^3$, CO content below 500 mg/Nm$^3$, and oxygen content below 5% by weight,
wherein heat is provided to the pyrolysis and drying stages in the updraft gasification reactor by radiation and convection from the gas combustion stage above the driving stage and by convection from the gasification and oxidation stage below the drying stage.

21. The system according to claim 20, further comprising:
a water sprinkling system configured to inject water into the fuel or into the gas combustion stage, and
a sensor configured to control the water sprinkling system.

22. The system according to claim 20, further comprising:
an ash screw to transport the ash out of the thermal reactor in a dry state.

23. The system according to claim 20, further comprising a reactor wall, which extends from a fuel inlet to an ash outlet in a horizontal or sloping direction so that fuel moves towards the ash outlet by gravity force.

* * * * *